(12) United States Patent
Foster

(10) Patent No.: US 8,521,652 B2
(45) Date of Patent: Aug. 27, 2013

(54) DISCOVERING LICENSES IN SOFTWARE FILES

(75) Inventor: Glen A. Foster, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 523 days.

(21) Appl. No.: 11/437,383

(22) Filed: May 19, 2006

(65) Prior Publication Data

US 2007/0271190 A1 Nov. 22, 2007

(51) Int. Cl.
*G06F 21/00* (2013.01)

(52) U.S. Cl.
USPC .................. 705/59; 705/51; 705/53; 705/57

(58) Field of Classification Search
USPC ......................................... 705/51, 53, 57, 59
See application file for complete search history.

(56) References Cited

U.S. PATENT DOCUMENTS

| | | | |
|---|---|---|---|
| 6,370,549 B1* | 4/2002 | Saxton | 707/205 |
| 6,499,035 B1* | 12/2002 | Sobeski | 707/103 R |
| 6,574,609 B1* | 6/2003 | Downs et al. | 705/50 |
| 2002/0083152 A1* | 6/2002 | Campara et al. | 709/217 |
| 2003/0088516 A1* | 5/2003 | Remer et al. | 705/59 |
| 2003/0236695 A1* | 12/2003 | Litwin, Jr. | 705/10 |
| 2004/0054909 A1* | 3/2004 | Serkowski et al. | 713/176 |
| 2004/0059703 A1* | 3/2004 | Chappell et al. | 707/1 |
| 2004/0133792 A1* | 7/2004 | Dublish et al. | 713/193 |
| 2005/0246241 A1* | 11/2005 | Irizarry et al. | 705/26 |
| 2008/0040619 A1* | 2/2008 | Dublish et al. | 713/193 |

* cited by examiner

*Primary Examiner* — Calvin Cheung

(57) ABSTRACT

Embodiments include methods, apparatus, and systems for discovering licenses in open source files. One method of software execution includes discovering a software license in code; and determining if the software license is a pre-existing open source software license.

9 Claims, 5 Drawing Sheets

DISCOVERING LICENSES IN SOFTWARE FILES

BACKGROUND

Open source software is source code or programs that are available at no charge to the public for study, use, and even modification. This code is freely shared between the public and software developers. Since the software is not proprietary, large groups of programmers can modify and improve the source code. The modified software is redistributed to the public and other programmers for use in a wide variety of software applications.

Generally, open source software is not commercially developed and distributed for financial gain since the source code is free. At the same time, however, the software is often subject to restrictions in the form of licenses. Open source licenses enable users to obtain the source code for free, but provide terms that can restrict use, modification, and redistribution of the source code. Such restrictions vary from license to license and range from being unrestrictive to quite restrictive. For instance, some licenses merely require users to preserve the name of the original authors or include a copyright statement within the actual source code. By contrast, other licenses severely restrict the rights of subsequent users to sue for patent infringement, collect royalties for derivative works, and grant licenses on modified versions of the software, to name a few examples.

Since some open source licenses are quite restrictive, software developers and companies must review and understand the terms and conditions of licenses before spending significant resources in using or modifying the source code. This task, however, can be quite difficult. Licenses are often embedded in the source code itself and hence not easily discovered. In order to locate such licenses, a person must manually review all of the source code to determine if a license is hidden or embedded within the code. This task is an enormous undertaking, especially when the source code exceeds tens of thousands of lines of code. Further, some open source software packages contain hundreds, thousands, or even millions of different files that contain many different licenses. In some instances, hundreds of hours are required to review each of these files in search of the software licenses. To complicate matters even further, open source software packages can contain many nested archives or compressed files that contain one or more licenses. Significant time is required to discover and decompress these files and then review them for licenses or other restrictive terms and conditions.

DETAILED DESCRIPTION

Figure 1:
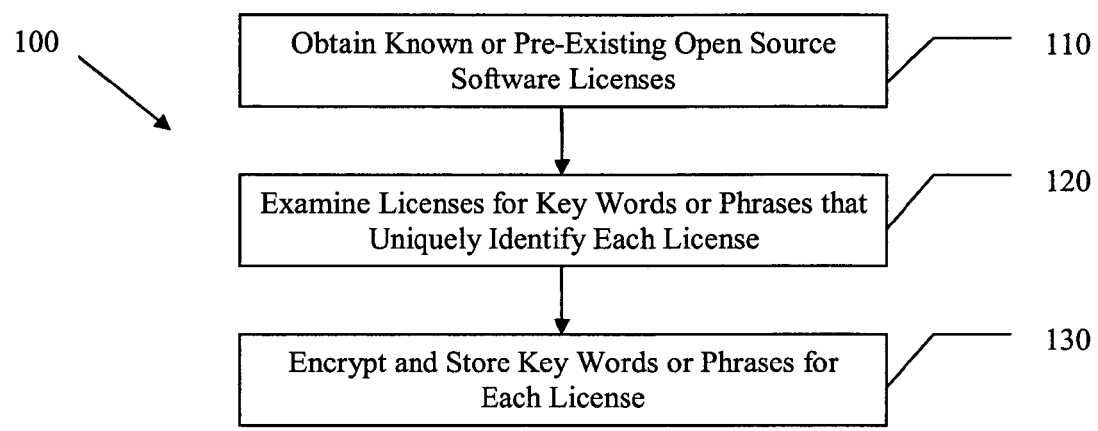
FIG. 1 is a flow diagram for uniquely identifying pre-existing open source software licenses in accordance with an exemplary embodiment of the present invention.

Embodiments in accordance with the present invention are directed to apparatus, systems, and methods for discovering and classifying licenses in software. Licenses are retrieved or identified from lengthy and complex source code that exceeds tens of thousands of lines of code. Such identification automatically occurs with little or no human intervention. Further, embodiments in accordance with the present invention quickly and accurately identify licenses within software packages that contain hundreds, thousands, or even millions of different files with one or more licenses. Such licenses can even be contained in nested archives, compressed files, or any variety of different file types. Further, embodiments in accordance with the present invention evaluate and classify licenses that are discovered. The terms and conditions of individual licenses are evaluated and then each license is classified or categorized according to predetermined criteria, such as restrictions on intellectual property. For instance, licenses are classified in various ranges from being innocuous or non-restrictive to being harmful or restrictive. Such analysis and classification are presented or displayed to a user in an easily discernable visual presentation or report.

In one exemplary embodiment, one or more files are reviewed to determine if such files contain any licenses or other restrictive terms and conditions. The number of files can vary from one to hundreds of thousands of different files. Files are initially identified according to one or more types, such as source package, binary package, archive, and regular or text files. Files that are compressed, nested, or otherwise packed are then unpacked. Each file is scanned for one or more keywords or phrases to determine whether such file is a candidate for having a license. The candidate license files are then ranked or scored according to one or more factors, such as the number of matches with keywords and phrases and/or the occurrence of particular keywords or phrases. False positives or spurious results (such as dictionaries) are removed from candidates of possible licenses. A determination is then made as to whether the candidate licenses are pre-existing or known licenses. Candidate licenses are compared against known licenses to determine if the candidate license is a copy or variation of another pre-existing license. In one exemplary embodiment, footprints of pre-existing or previously discovered licenses are compared against words or phrases in the candidate licenses to identify the candidate licenses.

In one exemplary embodiment, candidate licenses are classified into one of two or more categories. For instance, candidate licenses are identified as being (1) copies of pre-existing or previously discovered licenses, or (2) new, unclassified licenses. In the first category, the candidate licenses are identified with pre-existing licenses and given a classification associated with the particular pre-existing license. For instance, if pre-existing license A is categorized as "highly restrictive," then the candidate license matching license A is also categorized as "highly restrictive" since the two licenses are the same.

Candidate licenses in the second category are new and thus not previously classified or categorized. In one exemplary embodiment, these licenses are ranked or scored, and the results are presented to a user for review. In one exemplary embodiment, licenses are ranked according to relevancy, restrictions, or thresholds that pertain to restrictions on intellectual property rights.

FIG. 1 is a flow diagram 100 for uniquely identifying pre-existing open source software licenses in accordance with an exemplary embodiment of the present invention. According to block 110, known or pre-existing open source software licenses are obtained or discovered. Open source files are subject to thousands of different licenses. Many of these licenses are obtainable over the internet, in open source software distribution packages, through organizations utilizing Free and Open Source Software (FOSS), and through organizations promoting open source, to name a few examples.

According to block 120, each known license is examined for keywords, phrases, or sentences that uniquely identify or distinguish the license from other licenses. For instance, each license can contain one or more keywords or phrases that exist only in the particular license. Such unique words or phrases are a footprint of the license. By way of example, if license A contains a phrase or sentence that does not occur in any other license, then this phrase or sentence is used as a footprint to uniquely identify license A and distinguish it from all other known licenses. For instance, a license can contain one or more unique company names, websites, numbers, acronyms, copyrights, etc. As another example, a license can contain one or more unique phrases, sentences, or even paragraphs that exclusively exist or only appear in the particular license.

According to block 130, the footprints discovered in connection with block 120 are stored. In one exemplary embodiment, such footprints are also encrypted to prevent a user from examining the executable code and determining which words, phrases, and/or sentences are being utilized as the footprints for each known license. At compile time, various strings are encrypted to obfuscate methods used to identify licenses, footprints, copyrights, etc. In this manner, malicious users are reasonably deterred from discovering the specific strings used as license footprints. At run time, such strings are then decrypted.

Figure 2:
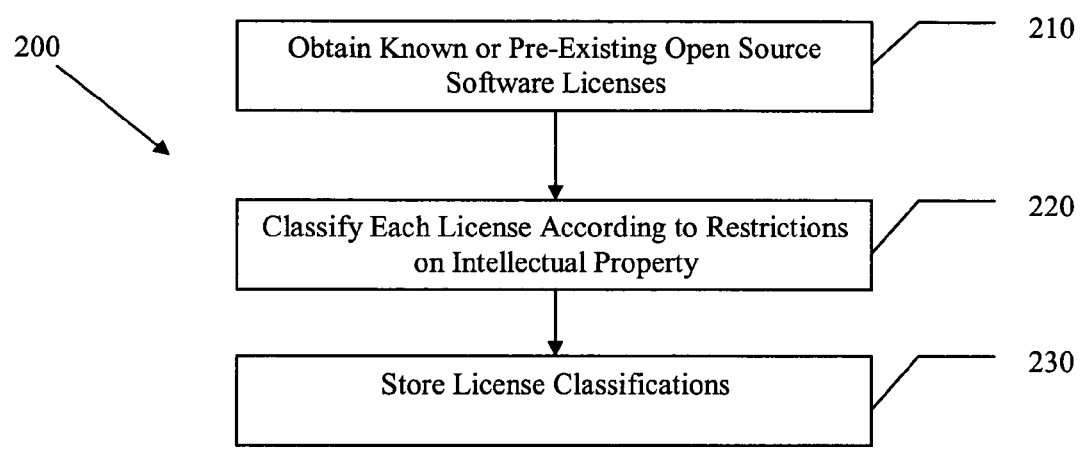
FIG. 2 is a flow diagram for classifying existing open source software licenses according to restrictions on intellectual property in accordance with an exemplary embodiment of the present invention.

FIG. 2 is a flow diagram 200 for classifying existing open source software licenses according to restrictions on intellectual property in accordance with an exemplary embodiment of the present invention. According to block 210, known or pre-existing open source software licenses are obtained or discovered. This block is similar to block 110 discussed in connection with FIG. 1.

According to block 220, each existing or discovered open source software license is classified according to restrictions on intellectual property. Open source licenses enable users to obtain the source code for free, but include terms that can restrict use, modification, and redistribution of the source code. Such restrictions vary from license to license and range from being unrestrictive to quite restrictive. For instance, some licenses merely require users to preserve the name of the original authors or include a copyright statement within the actual source code. By contrast, other licenses restrict the rights of subsequent users to sue for patent infringement, collect royalties for derivative works, and grant licenses on modified versions of the software, to name a few examples.

Each known license, thus, can have different or varying degrees of restrictions on intellectual property. In one exemplary embodiment, these restrictions are classified and associated with the known licenses. For instance, if license A has highly restrictive terms and conditions, then this license is classified as being highly restrictive. If license B has moderately restrictive terms and conditions, then this license is classified as being moderately restrictive. If license C has few or no restrictive terms or conditions, then this license is classified as being unrestrictive.

Classification of known licenses assists users in analyzing subsequent software licenses and determining if such licenses are pertinent to intellectual property rights. By way of example, an open source software package can contain hundreds of licenses. If one of these licenses is identified as being license A, then the classification of "highly restrictive" is automatically associated with this discovered license. This highly restrictive classification alerts or notifies a user that this license is harmful or restrictive to intellectual property rights. By contrast, if one of these licenses is identified as being license C, then the classification "unrestrictive" is associated with this discovered license. This unrestrictive classification alerts or notifies a user that this license is not harmful or restrictive to intellectual property. Further review of this license would not be required since the license was previously reviewed and determined to be unrestrictive.

Embodiments in accordance with the present invention are not limited to any type or number of restrictions and associated classifications. Three classifications (highly restrictive for license A, moderately restrictive for license B, and unrestrictive for license C) are discussed for exemplary illustration.

According to block 230, the classifications for each known license are stored. These classifications are retrieved when known or existing licenses are discovered in files or open source software packages. Such classifications are then presented to a reviewer. Significant time is saved since reviewers do not have to review licenses previously classified as nonrestrictive or even restrictive. Nonrestrictive licenses were previously classified as not being harmful to intellectual property and thus require no further review. Restrictive licenses also would not require further review since the restrictive nature of such licenses is precisely known from previous analysis and evaluation.

Figure 3:
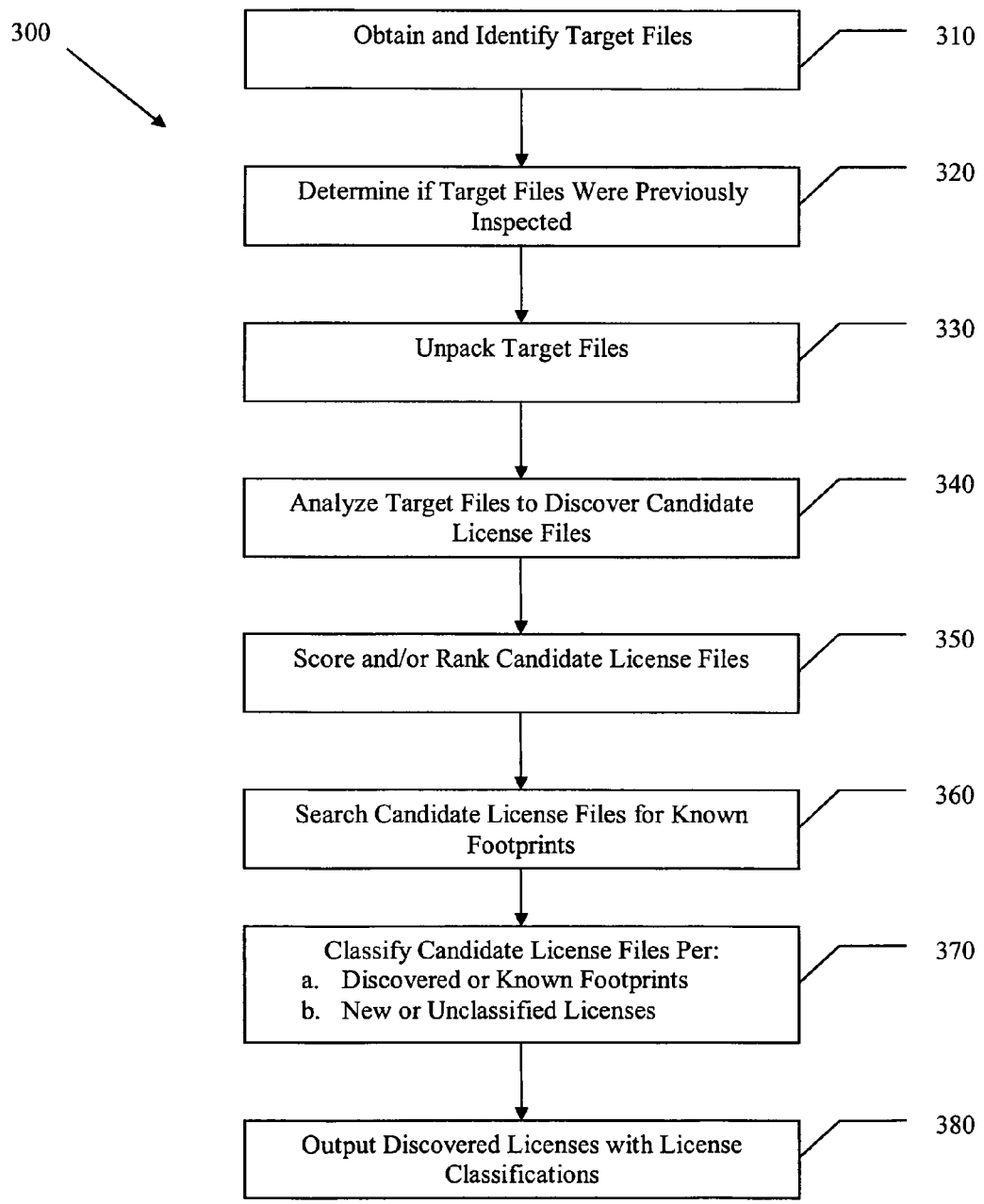
FIG. 3 is a flow diagram for discovering and classifying licenses in accordance with an exemplary embodiment of the present invention.

FIG. 3 is a flow diagram 300 for discovering and classifying licenses in accordance with an exemplary embodiment of the present invention. According to block 310, one or more target files are obtained and identified. The number of target files ranges from a single file to hundreds of thousands of files, such as files existing in an open source software package or an open source software distribution.

In one exemplary embodiment, each file is identified or classified as belonging to a group that includes, but is not limited to, a source package, a binary package, an archive (example, zip, tar, cpio, other compressed archive files, etc.), or text or regular files (example, non-packed files).

According to block 320, a determination is made as to whether any of the target files were previously inspected. In one exemplary embodiment, each package and archive are checked or compared against knowledge-bases of previously-inspected and previously-approved components or licenses. For example, if the source code for a particular version of a package was already processed, then the code is not re-processed since the results for the package were previously determined.

According to block 330, target files are unpacked. Files can be "packed" or archived and contain one or more other files in a nested or compressed format. Each package and archive is recursively unpacked until further unpacking is not required (example, with data, executable code, and text files). Reference to the original file being unpacked is stored or remembered.

In one exemplary embodiment, many different file formats are known or used for recursive unpacking. For example, such file formats include, but are not limited to, zip, tar, ar, cpio, gzip, bzip2, rpm, deb, rar, jar, cabinet files, postscript, and uuencode/uudecode, etc. Archives are recursively uncompressed and unpacked if such archives contain other files. Unpacking ceases once a determination is made that no files require unpacking. In one exemplary embodiment, executables, object modules (library code), and binary data are considered as unpackable since they can contain compiled strings that may contain copyright statements or copyright symbols.

According to block 340, the target files are examined or analyzed to discover candidate license files (i.e., files that are likely to contain one or more licenses). In one exemplary embodiment, each file is scanned for one or more words, symbols, phrases, sentences, and/or paragraphs that are commonly or typically used in open source software licenses.

Files can also incorporate open source licenses by reference. For instance, incorporating by reference can occur with copyright notices, trademarks, URLs, proper names (authors, universities, organizations, etc.), and use of certain words (variations or derivatives of "incorporate by reference"). Occurrence of such terms is an indication that a license is being incorporated by reference.

According to block 350, candidate license files are scored and/or ranked. For instance, a score or rank is assigned to each candidate license file based on a number of hits or occurrences of the words, symbols, phrases, sentences, and/or paragraphs that occur in the file. A list of license candidates is generated based on the scores, ranks, or other exclusionary aspects (example, some files are spelling-dictionaries and will match many of the legal words used in licenses but can be safely ignored, which results in faster execution time).

In one exemplary embodiment, each unpacked text or executable file is scanned, and a score is computed for each file based on the count of a unique set of plural words and phrases commonly-used in existing or known open source software licenses. A higher score indicates a greater likelihood or probability of the file containing an open source software license.

In one exemplary embodiment, approximately twenty different keywords or phrases are selected for comparison with files. By way of example, these keywords and phrases include, but are not limited to, the following and variations thereof: copyright, warrant, license grant, distrib, damage, liability, require, agreement, patent, deriva, acknowledgment, free software, terms and conditions, public domain, as is, same terms, source code, open source, and source and binary. Some of the words appear misspelled but are actually root words or shortened versions of words. For instance, "deriva" will match derivation and derivative. Likewise, the word "distrib" will match distribution, re-distribution, distribute, etc. Embodiments in accordance with the present invention can track how many words/phrases are present in each file and then score the file based on the number of words/phrases present. For instance, assume that twenty keywords and phrases are selected for comparison with different files. If a file has approximately nine or more out of twenty of these keywords or phrases, then the file is most likely either (a) a spelling-dictionary reference file (or perhaps a thesaurus input file) or (b) an open source license. As such, if the highest scoring file in a component is nine or more, it is not necessary to parse files with a much lower score (for example, four or less). Files with a lower score generally do not contain open source licenses. In this way, execution time is optimized by ignoring files that are likely to not contain licenses.

Some high scoring files can in fact be dictionaries, thesauruses, or the like. Preferably, these files are ignored to optimize execution time. In one exemplar embodiment, candidate licenses are distinguished from dictionaries and thesaurus by checking files for word or phrases that are not likely to occur in open source software license but typically occur in dictionaries and thesauruses.

According to block 360, candidate license files are searched for known footprints. As one example, the footprints are discovered and stored as described in connection with FIG. 1.

The contents of each license candidate are compared against unique words, numbers, sentences, and/or paragraphs in known open source licenses. This comparison reveals or determines what licenses, if any, are present or referenced in the candidate. If a license is not known (example, a footprint does not exist for the candidate), then the license is evaluated to determine whether the file contains a general pattern of a license. For instance, plural keywords are checked in a range of adjacent lines of text to identify unclassified licenses. If there are no licenses (known or unclassified) found, then further searching occurs. For example, further searches are directed to copyright statements, references to company trademarks, statements about software being considered public domain, notices of licensing under commercial-only or non-commercial-only, not-for-profit, and other various "interesting but not quite a license" items.

In one exemplary embodiment, each license footprint consists of a search seed. For instance, copyright statements typically contain the word "copyright," a derivation of this word, or a copyright symbol. These search seeds are checked in the text file, and an arbitrary number of lines of text above and below are saved. This data is then stripped of punctuation, source-code comments, HTML (Hyper Text Markup Language) and XML (Extensible Markup Language) directives (if applicable), PostScript control and formatting statements (where appropriate). Multiple spaces and tabs are then compressed to a single space. At this point, the data is placed into a string that is a series of words separated by a single space and compared to the different license footprints. The search results are cached or hashed to expedite the text-searches.

According to block 370, the candidate licenses are generally classified into one of two categories: (a) discovered or known footprints, or (b) new or unclassified licenses. In one exemplary embodiment, the footprints are discovered as described in connection with FIG. 1. The candidate licenses are compared with the known footprints to determine if the candidate license already exists (example, the candidate license is a duplicate of a pre-existing or previously discovered open source software license). Alternatively, if the candidate license does not include a known footprint, then the candidate license is classified as a new or unclassified license.

According to block 380, discovered licenses are stored and output (example, the output is provided to a display and/or provided in a report). The output includes any licenses matching known footprints (i.e., previously identified and classified licenses) and the unclassified licenses.

Figure 4:
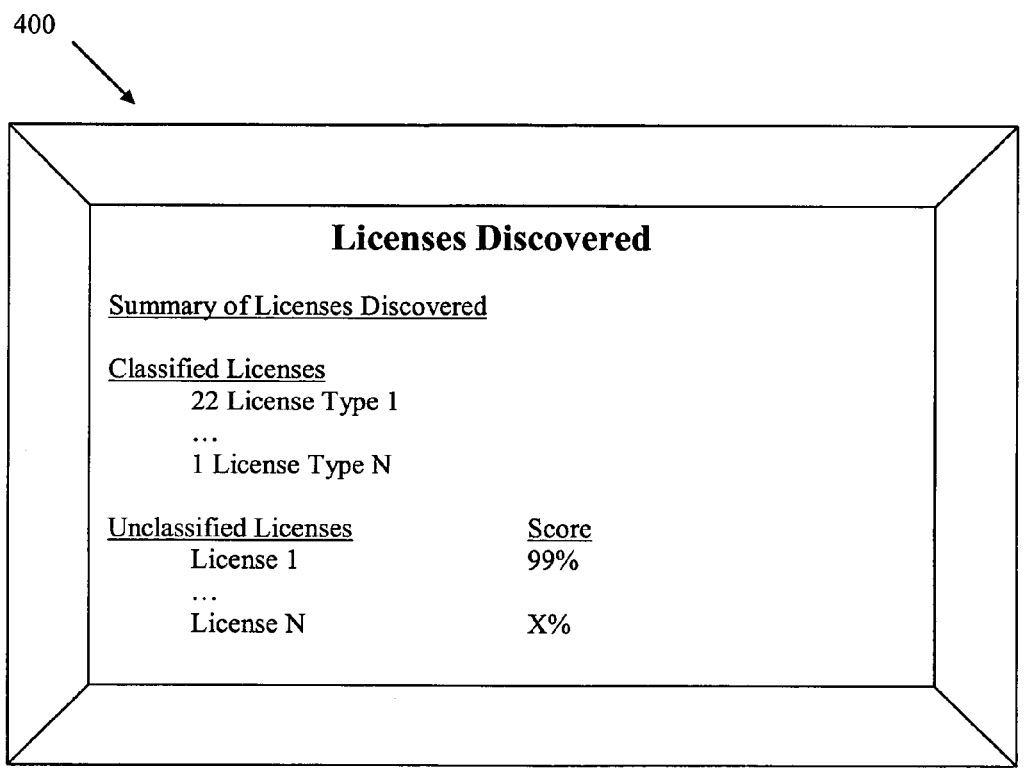
FIG. 4 is a display showing exemplary output of discovered licenses in accordance with an exemplary embodiment of the present invention.

FIG. 4 is a display 400 showing exemplary output of discovered licenses in accordance with an exemplary embodiment of the present invention. In one exemplary embodiment, the output includes a summary of licenses discovered. The summary includes, for example, a license summary for the original target files that were obtained and identified according to block 310 in FIG. 3.

In one exemplary embodiment, the output includes a list of both classified licenses and unclassified licenses as discussed in connection with block 370 of FIG. 3. As shown in display 400, for example, the heading "Classified Licenses" lists all of the classified licenses that exist in the target files. These licenses are listed in numerical or descending order based on a number of licenses discovered. For instance, twenty two licenses of type I were discovered as being pre-existing or classified licenses. Further, the heading "Unclassified Licenses" lists all of the unknown or unclassified licenses that exist in the target files. By way of example, these licenses are listed in descending order based on a ranking or scoring. For instance as shown in display 400, license I has a high score or rank of 99% and is thus ranked first. One skilled in the art will appreciate that scores and rankings can be output or displayed using various visual techniques including, but not limited to, integers, symbols, letters, percentages, colors, graphs, charts, lines, indicia, and combinations thereof.

In one exemplary embodiment, the licenses in each package or archive are classified into license buckets that are based on a set of rules (such as restrictions to intellectual property). The buckets are displayed or provided in a written report.

In one exemplary embodiment, the output is provided as a report that is in the form of a webpage. For instance, the webpage lists or displays the contents of each license bucket or other output (example, "Classified Licenses" and "Unclassified Licenses" of display 400 in FIG. 4). Each package and/or archive has a separate webpage with data (and other supporting webpages) that summarize the results of the licenses found and includes summaries and other analysis. By way of example, the output shown in FIG. 4 or variations thereof appears at a webpage. Each heading (Summary of Licenses Discovered, Classified Licenses and Unclassified Licenses) can be a hyperlink or clickable link for navigating to other pages or retrieving additional information.

In one exemplary embodiment, reviewers can access the output at a website and upload the results of the output. For instance, after discovering the licenses, one or more users are automatically sent an email message that includes a hyperlink or universal resource locator (URL) linking to the completed license report.

The output can be arranged using a variety of techniques and nomenclature. The following examples illustrate this diversity. For example, in one exemplary embodiment, similar licenses are grouped together to simplify review of the open source licenses. For instance, re-used packages appear in a bucket or heading named "previously-approved licenses." Packages with new versions but the same name and license-summaries appear in a bucket or heading named "new approved licenses." Licenses matching specific strings appear in a bucket or heading named "KNOWN BAD licenses." Further, licenses with specific sub-strings appear in the bucket or heading "Suspected BAD licenses." Other notable buckets or headings include instances where all license components match a list of known-safe licenses (the bucket is named the "Friendly licenses list") and a "Similar package name with different licenses" bucket that shows the reviewer where similarly-named packages have completely different licenses within them. Users can also define their own license buckets and specify the search criteria used to determine to which bucket a license belongs.

With embodiments in accordance with the present invention, the need for human intervention in the license-review process is drastically reduced since known licenses are classified and unknown license are ranked according to relevancy or importance. Once the output is generated (example, created at a website), a reviewer can easily review thousands of packages (containing hundreds-of-thousands of licenses) in a matter of minutes, as opposed to weeks or even months.

Figure 5:
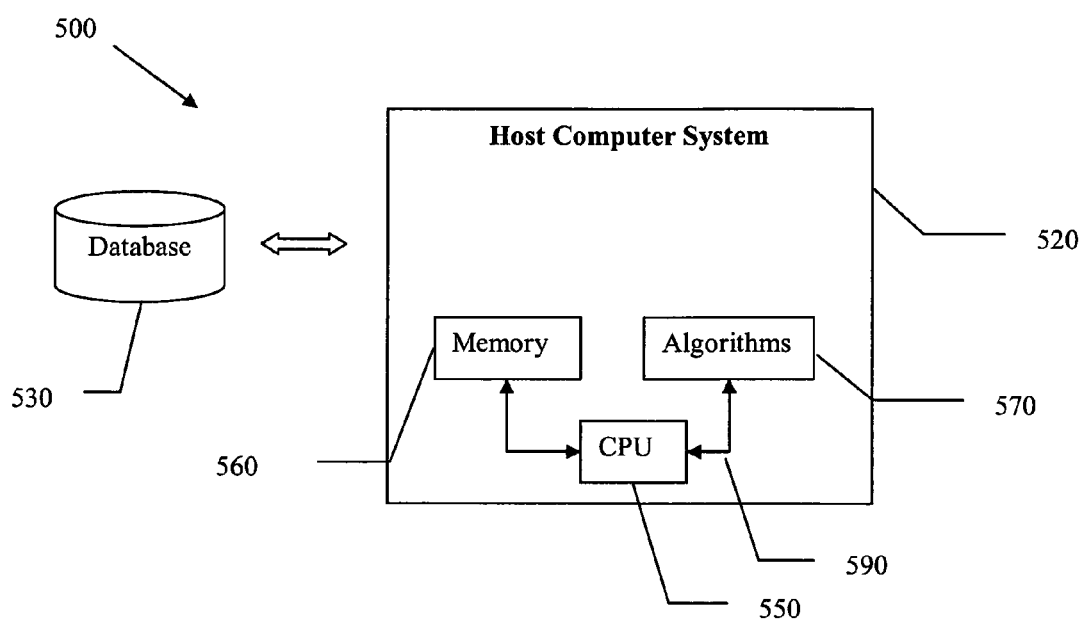
FIG. 5 is a block diagram of an exemplary computer system in accordance with the present invention.

Embodiments in accordance with the present invention are utilized in a variety of systems, methods, and apparatus. FIG. 5 illustrates an exemplary embodiment as a computer system 500 for utilizing one or more of the flow diagrams and/or aspects of exemplary embodiments in accordance with the present invention.

The system 500 includes a host computer system 520 and a repository, warehouse, or database 530. The host computer system 520 comprises a processing unit 550 (such as one or more processors of central processing units, CPUs) for controlling the overall operation of memory 560 (such as random access memory (RAM) for temporary data storage and read only memory (ROM) for permanent data storage) and algorithms 570 (which may be located in memory 560 or other location). The memory 560, for example, stores data, control programs, and other data associate with the host computer system 520. The processing unit 550 communicates with memory 560, data base 530, algorithms 570 (such as one or more license discovery and/or classification algorithms), and many other components via buses 590. These algorithms include, but are not limited to, the flow diagrams of FIGS. 1-3 and variations thereof.

Embodiments in accordance with the present invention are not limited to any particular type or number of databases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

As used herein, the term "source code" means program instructions written in a particular programming language. Further, as used herein, the term "open source" refers to a program or source code that is available at no charge to the general public for use and modification. Further, as used herein, the term "license" means a contract or terms and conditions that grant a party explicit rights to use intellectual property. Thus, an open source license states terms, conditions, and/or restrictions on a licensor in order to use, modify, or redistribute open source. Open source often includes or is subject to an open source license. For instance, such licenses can specify different standards or restrictions regarding how the source code is used, distributed, or modified. By way of example, some of these standards include, but are not limited to, the following: licensed software cannot implement restrictions on other software distributed with the licensed software, all persons have equal access to the software, rights to the software are not contingent on the software being part of a specific software distribution, authors must allow modifications or derivative works and maintain the original name, collection of royalties for distribution of the program is prohibited, and discrimination against specific fields of endeavor is prohibited, to name a few examples.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

Embodiments in accordance with the present invention are not limited to finding open source software licenses using text-search, classifications, or other methods. Embodiments in accordance with the present invention are applicable to various fields. For example, instead of looking for keywords specific to intellectual property or licenses, an engine in accordance with the invention can discover and classify candidates of files that may or may not deal with other software technologies.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A non-transitory computer readable medium having instructions for causing a computer to execute a method, comprising:
   examining plural different software files for known licensing terms;
   scoring the software files that contain one or more of the known licensing terms; and
   determining if one of the software files includes a copy of a pre-existing software license that was previously discovered.

2. The non-transitory computer readable medium of claim 1 further comprising, identifying the software files that are one of a source package, a binary package, and an archive.

3. The non-transitory computer readable medium of claim 1 further comprising:
   identifying archive files among the software files;
   unpacking the archive files.

4. The non-transitory computer readable medium of claim 1 further comprising, determining if one of the software files is a dictionary.

5. The non-transitory computer readable medium of claim 1 further comprising, encrypting the known licensing terms to prevent a user from determining which words, phrases, or sentences are being utilized as the known licensing terms.

6. The non-transitory computer readable medium of claim 1 further comprising, comparing word phrases in the software files with word phrases exist in the pre-existing software license to determine if the software files contain the pre-existing software license.

7. The non-transitory computer readable medium of claim 1 further comprising:
   ranking the software files that contain one or more of the known licensing terms;
   displaying rankings for the software files that contain one or more of the known licensing terms.

8. The non-transitory computer readable medium of claim 1 further comprising, creating a website that includes rankings for the software files that contain one or more of the known licensing terms.

9. The non-transitory computer readable medium of claim 1 further comprising, searching the software files for a statement of copyright ownership to determine if one of the software files contains a reference to a software license.

* * * * *